United States Patent
Pike et al.

(10) Patent No.: US 7,483,949 B2
(45) Date of Patent: Jan. 27, 2009

(54) E-MAIL CACHING SYSTEM AND METHOD

(75) Inventors: Tyrone F. Pike, Woodside, CA (US);
Jeffrey M. Looman, Orem, UT (US); J. Bernard Gille, Lindon, UT (US);
Jeffrey D. Blair, American Fork, UT (US)

(73) Assignee: Cemaphore Systems, Inc., San Mateo, CA (US)

( * ) Notice: Subject to any disclaimer, the term of this patent is extended or adjusted under 35 U.S.C. 154(b) by 6 days.

(21) Appl. No.: 11/104,193

(22) Filed: Apr. 11, 2005

(65) Prior Publication Data

US 2006/0020671 A1    Jan. 26, 2006

Related U.S. Application Data

(60) Provisional application No. 60/561,616, filed on Apr. 12, 2004.

(51) Int. Cl.
*G06F 15/16* (2006.01)
*G06F 15/173* (2006.01)

(52) U.S. Cl. .................. 709/206; 709/204; 709/225
(58) Field of Classification Search .......... 709/204–207
See application file for complete search history.

(56) References Cited

U.S. PATENT DOCUMENTS

| 6,546,416 | B1* | 4/2003 | Kirsch | 709/206 |
|---|---|---|---|---|
| 6,826,611 | B1* | 11/2004 | Arndt | 709/226 |
| 6,829,607 | B1* | 12/2004 | Tafoya et al. | 707/6 |
| 6,859,213 | B1* | 2/2005 | Carter | 715/752 |
| 7,103,599 | B2* | 9/2006 | Buford et al. | 707/10 |
| 7,260,606 | B1* | 8/2007 | Wasilko | 709/206 |
| 2002/0065891 | A1* | 5/2002 | Malik | 709/206 |
| 2002/0071422 | A1* | 6/2002 | Amicangioli | 370/351 |
| 2002/0138580 | A1* | 9/2002 | Al-Kazily et al. | 709/206 |
| 2003/0069935 | A1* | 4/2003 | Hasegawa | 709/206 |
| 2003/0163722 | A1* | 8/2003 | Anderson, IV | 713/200 |
| 2004/0052216 | A1* | 3/2004 | Roh | 370/252 |
| 2004/0068542 | A1* | 4/2004 | Lalonde et al. | 709/206 |
| 2004/0093382 | A1* | 5/2004 | Kulkarni | 709/206 |
| 2004/0199595 | A1* | 10/2004 | Banister et al. | 709/207 |
| 2005/0038865 | A1* | 2/2005 | Noda et al. | 709/213 |
| 2005/0125553 | A1* | 6/2005 | Wu et al. | 709/233 |
| 2007/0130273 | A1* | 6/2007 | Huynh | 709/206 |

OTHER PUBLICATIONS

Jupitermedia Corporation, subnet mask Nov. 2, 2001, Jupitermedia Corporation.*

* cited by examiner

*Primary Examiner*—Tonia L Dollinger
*Assistant Examiner*—David E England
(74) *Attorney, Agent, or Firm*—Manatt, Phelps and Phillips, LLP; Imran A. Khaliq

(57) ABSTRACT

A system and method to improve data access over a network. According to one embodiment of the present invention, a device for caching data from a server, such as e-mail messages, is provided at a location close to an end user. According to another embodiment of the present invention, a centrally stored address list is provided that may be accessed by a client to determine the best or nearest server for data access.

16 Claims, 2 Drawing Sheets

E-MAIL CACHING SYSTEM AND METHOD

CROSS-REFERENCE TO RELATED APPLICATION

The present application claims priority from U.S. Provisional Application Ser. No. 60/561,616 filed Apr. 12, 2004, which is incorporated herein by reference in its entirety for all purposes.

BACKGROUND

1. Field of the Invention

Embodiments of the present invention relates to transmission of data over a computer network. More particularly, the present invention relates to caching data from a server, such as e-mail messages, at a location close to an end user to improve data access.

2. State of the Art

Poor performance is a major problem associated with end users who must access e-mail messages or similar personal data stored on a server over a wide area network (WAN). This problem is often due to a combination of high network latency and low transmission bandwidth. One possible solution is to cache the data at a secondary location closer to the end user. Known caching solutions are intended to deal with relatively static data, however, such as when proxy servers are used to store data in the form of web content. A data store comprising web content is considered "static" in the sense that a single data set may be provided for access by multiple users and typically does not require modification on a regular basis. A data store on an e-mail server, on the other hand, is comprised of multiple message stores that are constantly modified by separate users. By design, e-mail servers centralize frequent asynchronous activities from disparate locations, such as with e-mail server to e-mail server message processing and e-mail to client message processing. Thus, there is a high frequency of change in an e-mail data store, and maintaining synchronous information between a cache and a host e-mail server is not possible using conventional static caching techniques. Caching of an e-mail server needs to occur at a much more granular level, i.e., at substantially the same rate as transactions occurring on the e-mail server.

In view of the foregoing, what is needed is a system and method that overcomes the problems associated with caching e-mail messages or similar dynamically changing data on a network.

BRIEF SUMMARY OF PREFERRED EMBODIMENTS OF THE INVENTION

According to an embodiment of the present invention directed to caching e-mail data, an e-mail server maintains a data store comprising a collection of individual message stores. Each of these message stores is typically associated with a single user and is referred to as a mailbox. When the user interacts with an e-mail server through an e-mail client, each operation, such as reading, deleting, or sending a message, comprises a transaction within that mailbox. A transaction may also comprise moving a message between mailbox folders or from one mailbox to another mailbox, whether between mailboxes on the same server or from one e-mail server to another. Using the prior art techniques discussed above, each of these transaction associated with a user's mailbox would require the contents of the aggregate data store of an e-mail server to be updated. Because of the frequency of transactions that occur on an e-mail server, caching only the transactions associated with a given mailbox is a more practical means of maintaining data integrity between an e-mail server and a caching device.

Proceeding with the notion of caching transactions within a given mailbox, the present invention provides a caching device such as a site local server that proxies a set of e-mail clients to the e-mail server and proxies the e-mail server to the set of e-mail clients. In simple terms a single instance of such a caching device, referred to herein as an "E-mail Message Caching Device" (EMCD), consists of a server hosting a set of virtual e-mail clients, a message store and one or more virtual e-mail servers. Placing an EMCD that delivers replicated messages to an e-mail client on demand closer to the user greatly enhances that user's experience, particularly in locations where the network infrastructure is poor.

Other and further features and advantages will be apparent from the following detailed description of the invention taken in conjunction with the accompanying drawings. The following examples are provided for the purposes of illustration only, and are not intended to be limiting. It will be understood by one of ordinary skill in the art that numerous combinations and modifications are possible for the embodiments presented herein.

BRIEF DESCRIPTION OF THE SEVERAL VIEWS OF THE DRAWINGS

In the drawings, which illustrate an example of what is currently considered to be the best mode for carrying out the invention.

DETAILED DESCRIPTION OF PREFERRED EMBODIMENTS

Figure 1:
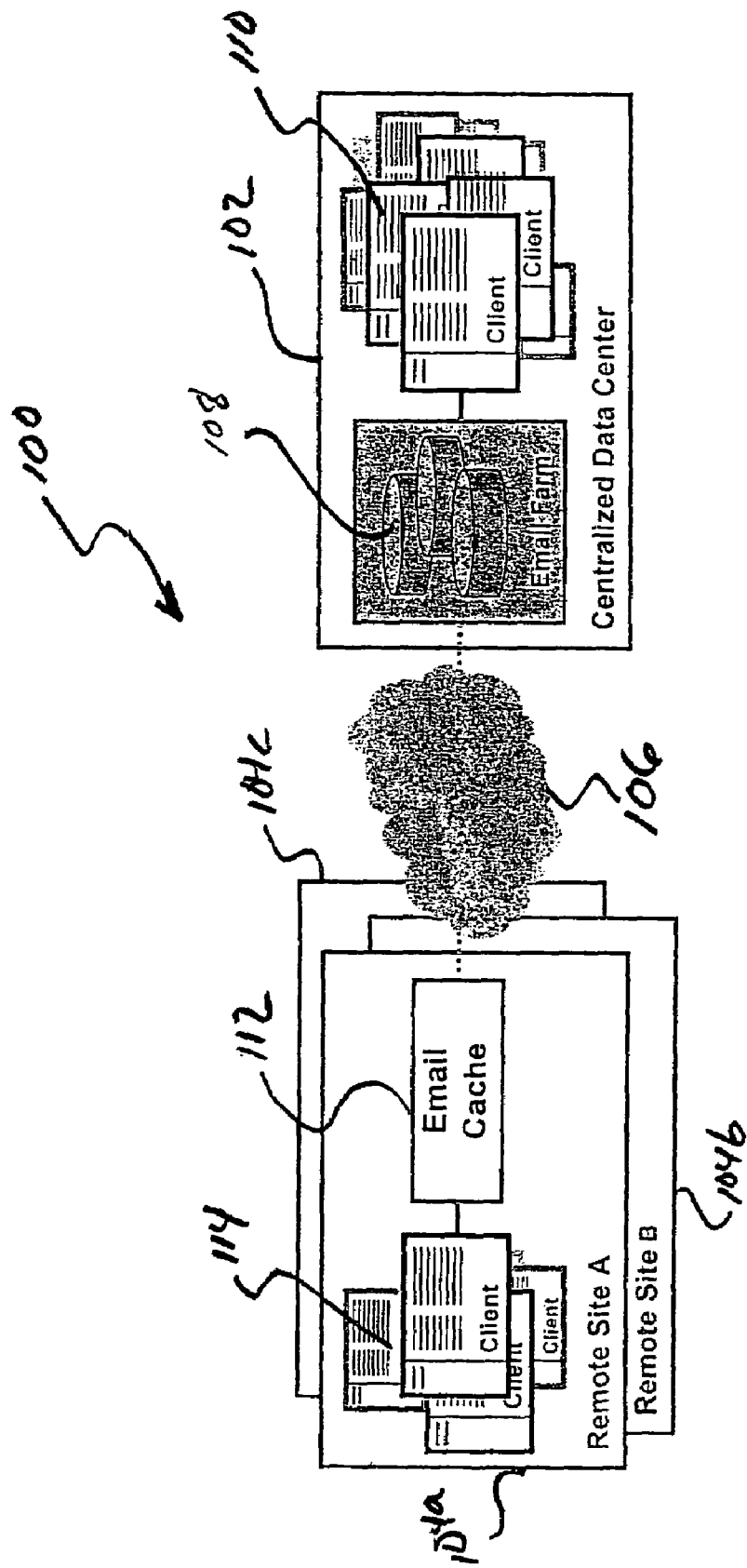
FIG. 1 is a schematic illustration of a computer network according to the present invention comprising a centralized data center connected to multiple remote sites over a WAN.

Referring in general to the accompanying drawings, various aspects of an exemplary computer network having a site local server comprising an EMCD are shown according to the present invention. Common elements of the disclosed embodiments are designated with like reference numerals for clarity. It should be understood that the figures presented are not meant to be illustrative of an actual configuration for a computer network, but are merely idealized schematic representations employed to more clearly and fully depict the invention.

FIG. 1 shows a computer network 100 according to the present invention comprising a centralized data center 102 and one or more remote sites 104a-c, which are connected over a WAN by a communications channel 106 such as the Internet. Data center 102 may be a local area network (LAN) at a company's main office or other central enterprise location, for example, while remote sites 104a-c may be LANs at company satellite offices. As shown in FIG. 1, data center 102 includes one or more e-mail servers 108, as well as a set of local e-mail clients 110. Each remote location 104a-c includes an EMCD 112 and a set of remote e-mail clients 114. It should be understood that computer network 100 is not limited to the illustrated components, but may include additional known network elements, such as servers for managing and storing other types of data. It is also possible that data center 102 and remote sites 104a-c might be placed at more proximate locations, such as at different floors or areas within the same building, or that network 100 is configured with a different number of remote sites.

Figure 2:
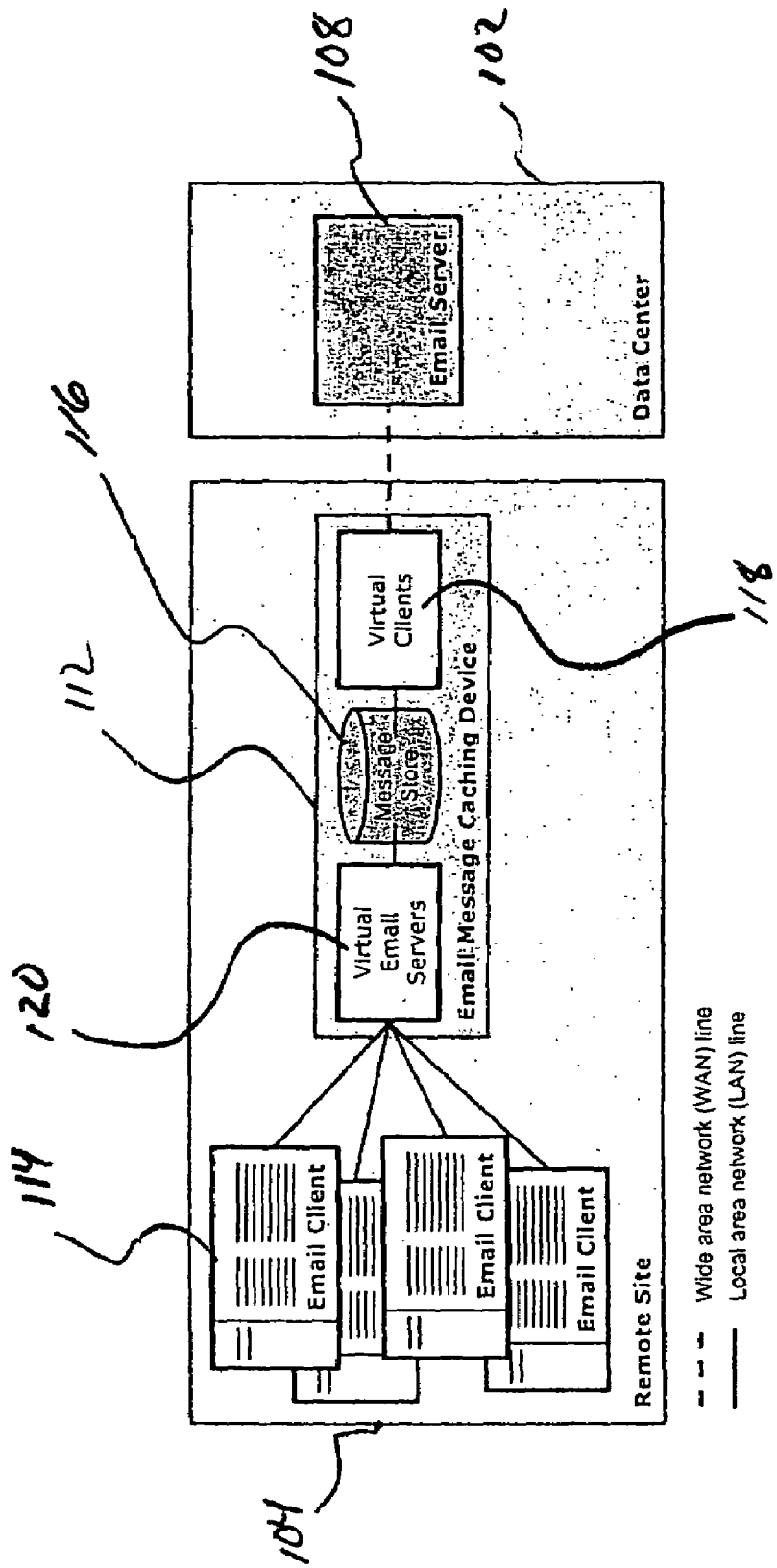
FIG. 2 is a schematic illustration showing how an EMCD according to the present invention acts as a proxy between an email server and a set of remote clients.

Turning to FIG. 2, the EMCD 112 includes a message store 116 and is configured to play two simultaneous roles: that of a proxy for each of the mailboxes cached and that of a server that hosts each user's mailbox. From the perspective of an e-mail server 108, the EMCD 112 appears as a set of authenticated (virtual) e-mail clients 118. Virtual e-mail clients 118 may request messages (e.g., to read), submit messages (e.g., sending or forwarding to another mailbox), and categorize messages (moving messages between folders) under programmatic control through a given protocol. Any known e-mail protocol may be implemented by the EMCD 112 according to the present invention, including POP, IMAP or MAPI. Messages acquired by an e-mail server 108 are placed in the message store 116, deleted messages are removed from the message store 116, and modified messages are updated. Virtual e-mail clients 118 monitor both e-mail server 108 and message store 116 for transactions that impact the state of data stored in a mailbox on an e-mail server 108 and the corresponding cache data stored on EMCD 112, and then propagate those transactions accordingly.

From the perspective of each e-mail client 114, the EMCD 112 appears as one or more virtual e-mail servers 120 responding to requests generated by the end user. When the end user reads a message on an e-mail client 114 it is fetched from the cached data stored on message store 116, deleted messages are removed from the message store 116, and modified messages are updated. Virtual servers 120 monitor both the e-mail client 114 and the message store 116 for transactions that impact the state of data on the e-mail client 114 and the corresponding cached data stored on EMCD 112, and then propagate those transactions accordingly.

Placing a site local server such as an EMCD 112 at a remote site enhances the end user's e-mail experience, but the improved performance is limited to the remote site where a given EMCD 112 is deployed. Placing an EMCD 112 at each remote site 104*a-c* allows a mobile user to take advantage of the EMCD deployed at any site where he or she may be accessing computer network 100. In order to communicate with a local EMCD 112, however, the IP address of the EMCD for that site must either be known ahead of time, or be discoverable by the e-mail client 114.

Requiring that the user know the address of each EMCD 112 at every remote site 104 is an annoyance that most users would not like to deal with and even if the user has an accurate list of addresses for every operating EMCD, if one of those addresses changes, the user's list becomes invalid and must be updated. There are several known auto discovery techniques that might be used to acquire this address information, such as a network broadcast by either the client 114 or the site local server, but most networks do not allow broadcasts across subnets. Accordingly, and as described in further detail below, the present invention provides a centralizing mechanism to add, delete, and modify IP addresses of EMCDs 112 deployed at each remote site 104.

Viewing the problem in generalized form, any application that relies on a site local server such as an EMCD 112 will need to know the IP address of each server at each site 104. In addition, it is preferable for these IP addresses to be maintained without end user or system administrator intervention.

Virtually all organizations maintain e-mail servers within the network infrastructure and access to those e-mail servers is global within that infrastructure. According to another embodiment of the present invention, a network address list, e.g. the IP address list, of site local servers such as EMCDs is placed within the mailbox of each user or in a public storage area, which centralizes the network address list for that user regardless of the location within the organization's network. Each time the user attempts to use a client to access a site local server, the list is retrieved from the user's e-mail account and is used to determine the address of the site local server.

By way of example, a process for finding the IP address of an appropriate site local server such as an EMCD 112 may include the following steps:

1. Placing the IP address list in an e-mail user's mailbox via the EMCD 112 or some other means such as a known management console;
2. The client 114 then reading the full IP address list from an e-mail server 108 each time the user attempts to access the EMCD 112; and
3. Parsing the list to determine viability within the client's local subnet to create a subset of plausible addresses.

An artifact of most modern e-mail servers permits an e-mail client to store ancillary data within a mailbox that is not viewable by the e-mail client. Information within the address list can be utilized by a modified e-mail client without any intervention on the part of the end user other than what is necessary to establish an account on the organization's e-mail server. Exploitation of this artifact allows one to use an e-mail server as a general-purpose centralizing mechanism at the level of granularity of a specific mailbox. Further, the granularity can be controlled by how widely the authentication credentials are distributed throughout an organization.

Extending this notion further, an n-tiered approach can be adopted such that the data stored within a given mailbox can include reference information that directs the client to a second, general mailbox containing a single instance of the ancillary data, so that only a single copy of the data need be maintained rather that replicating updated information across several mailboxes. In other words, a form of indirection can be used so that common data can be maintained across and referred to by several mailboxes.

A specific instance of this generalized concept is realized with the centralization of an IP address table of site local servers. Table 1 is an exemplary list of IP addresses. The IP address table data of site local servers would be structured as a tag identifying the type of site local server and a table containing the IP address and Classless Inter-Domain Routing (CIDR) address blocks, each row representing all of the addresses for a given type of site local server.

TABLE 1 example IP address table

| Server Type | Address | CIDR | Address | CIDR | Address | CIDR |
|---|---|---|---|---|---|---|
| EMCD | 172.17.2.5 | 24 | 172.17.5.14 | 24 | | |
| ACD | 10.0.1.5 | 24 | | | | |
| 1138 | 201.3.63.5 | 16 | 201.3.55.5 | 16 | 10.0.10.2 | 24 |

An address/CIDR column pair represents the existence of a site local server. As is well known to those of ordinary skill, the CIDR column here represents a shorthand for the IP Address Mask used in conjunction with the Address column to define a specific subnet. For example, a value of "24" means that the address mask would have the high-order 24 bits of a 32-bit IPv4 address set to "1", with the balance set to "0".

The table would typically be housed within a tagged file format such as XML, with a copy of the table residing in each end user's mailbox. Additional information can be housed within the table such as last access date so the table can be pruned in the event that a specific server is taken offline indefinitely.

A small software component residing on the end user's computer would be used to access the table either in conjunction with or ancillary to e-mail client activity. The code fragment would acquire the table in file form, parse and filter it, and use the result to locate an active site local server. By way of example and with the IP addresses shown in Table 1, the process with respect to an EMCD 112 is as follows:

1. Client 114 acquires the table from the e-mail server 108;
2. Client 114 parses the table to retrieve the addresses for a given server type, e.g. the EMCD 112;
3. Client 114 acquires the local address in which it is currently running
4. For each address/mask pair retrieved in step 2
   a. Client 114 bitwise ANDs together the local address and the CIDR block mask
   b. Client 114 bitwise ANDs together the table address and the CIDR block mask
   c. Client 114 compares the resulting value from step 4.a and 4.b. If they are equal, the table address is included in the resulting list of potential addresses. If they are not equal, the address is discarded from consideration (step 5);
5. Client 114 attempts to open a communication session with EMCD 112 at the resultant address(es).

The method used for placement and retrieval of the table file is dependent upon the type of target e-mail server 108.

Although the present invention has been described with respect to the above exemplary embodiments, various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A method for caching e-mail data over a network, comprising:
    storing e-mail data on an e-mail server at a first network location;
    accessing the network with a client at a second network location;
    retrieving a site local e-mail message caching device (EMCD) IP address table with the client using IP address table information stored in a user's mailbox;
    comparing a network location of the client to the site local EMCD IP address table; and
    selecting a site local (EMCD) for caching the e-mail data from the e-mail server based on the network proximity of the site local (EMCD) to the client;
    said comparing comprising the steps of:
    parsing the IP address table to retrieve at least one IP address record for a given (EMCD), wherein the IP address record includes at least one IP address/mask pair of an (EMCD);
    wherein for each IP address/mask pair retrieved:
    performing a first bitwise AND between a client local address and the mask of the address/mask pair;
    performing a second bitwise AND between the table address and the mask of the address/mask pair;
    comparing a resulting value from the first and the second bitwise AND for a match; and
    in response to a match, including the table address in a resulting list of potential IP addresses for the site local (EMCD);
    if there is no match, the address is discarded from consideration.

2. The method according to claim 1, wherein the user's mailbox storing the IP address table information is on the e-mail server at the first network location.

3. The method according to claim 2, wherein the e-mail data is stored in the user's mailbox.

4. The method according to claim 1, wherein the selected site local (EMCD) is located on the same LAN as the client.

5. The method according to claim 1, wherein the IP address table list information stored in the user's mailbox comprises the list of site local (EMCD) addresses.

6. The method according to claim 1, wherein the first network location comprises a first LAN and the second network location comprises a second LAN.

7. A system for caching data over a computer network, comprising:
    a server having a first store for e-mail data at a first location;
    a client for accessing the e-mail data at a second location, the first location and the second location being connected over a network; and
    a site local e-mail message caching device (EMCD) at the second location comprising a second store for email data, wherein the site local EMCD is configured to act as a proxy for transmitting e-mail data between the server and the client, wherein
    the site local (EMCD) further comprising virtual e-mail clients that communicate with said server to cache transactions between said server and the (EMCD);
    said (EMCD) being located by
    maintaining an IP address table for the site local (EMCD) at said email server;
    placing the IP address table in an e-mail user's mailbox at said e-mail server;
    in response to a user attempting to access said site local (EMCD) from a client, reading the IP address table from said e-mail user's mailbox at said e-mail server; and
    parsing the IP address table to retrieve at least one IP address record for a given EMCD, wherein the IP address record includes at least one IP address/mask pair of an EMCD;
    wherein for each IP address/mask pair retrieved:
    performing a first bitwise AND between a client local address and the mask of the address/mask pair;
    performing a second bitwise AND between the table address and the mask of the address/mask pair;
    comparing a resulting value from the first and the second bitwise AND for a match; and
    in response to a match, including the table address in a resulting list of potential IP addresses for the site local (EMCD);
    if there is no match, the address is discarded from consideration.

8. The system according to claim 7, wherein the network comprises a WAN.

9. The system according to claim 7, wherein the first location comprises a first LAN, and the second location comprises a second LAN.

10. The system according to claim 7, wherein the virtual e-mail clients communicate with the server using a given e-mail protocol selected from the group consisting of POP, IMAP or MAPI.

11. The system according to claim 7, wherein the virtual e-mail clients monitor both the server and the EMCD for transactions on the state of data stored in a mailbox on the server and the corresponding data stored on the EMCD and then propagate those transactions between the EMCD and the server accordingly.

12. A method for accessing an e-mail message caching device (EMCD), comprising:
   maintaining an e-mail server;
   providing a site local (EMCD);
   maintaining an IP address table for the site local (EMCD) at said e-mail server;
   placing the IP address table in an e-mail user's mailbox at said e-mail server;
   in response to a user attempting to access said site local (EMCD) from a client, reading the IP address table from said e-mail user's mailbox at said e-mail server; and
   parsing the IP address table to retrieve at least one IP address record for a given (EMCD), wherein the IP address record includes at least one IP address/mask pair of an EMCD;
   wherein for each IP address/mask pair retrieved;
   performing a first bitwise AND between a client local address and the mask of the address/mask pair;
   performing a second bitwise AND between the table address and the mask of the address/mask pair;
   comparing a resulting value from the first and the second bitwise AND for a match; and
   in response to a match, including the table address in a resulting list of potential IP addresses for the site local (EMCD);
   if there is no match, the address is discarded from consideration.

13. The method according to claim 1, wherein the client and the site local (EMCD) are located within a first LAN and the e-mail server is located within a second LAN.

14. The method according to claim 13, wherein the first LAN and the second LAN are connected over a WAN.

15. The method according to claim 1, wherein the IP address list is placed in an e-mail user's mailbox by one of a site local server and a management console.

16. A method for identifying a site local (EMCD), comprising:
   placing code on a client computer to retrieve an IP address table;
   acquiring the IP address table from an e-mail server;
   parsing the IP address table to retrieve at least one IP address record for a given EMCD, wherein the IP address record includes at least one IP address/mask pair of an EMCD;
   wherein for each IP address/mask pair retrieved:
   performing a first bitwise AND between a client local address and the mask of the address/mask pair;
   performing a second bitwise AND between the table address and the mask of the address/mask pair;
   comparing a resulting value from the first and the second bitwise AND for a match; and
   in response to a match, including the table address in a resulting list of potential IP addresses for the site local (EMCD);
   if there is no match, the address is discarded from consideration.

* * * * *